US007864076B2

(12) United States Patent
Ahn

(10) Patent No.: US 7,864,076 B2
(45) Date of Patent: Jan. 4, 2011

(54) CHARACTER ARRANGEMENTS, INPUT METHODS AND INPUT DEVICE

(76) Inventor: Jaewoo Ahn, # 101 Shinsegae Villa, 290, Gumi-dong, Bundang-gu, Gyeonggi-do, Seongnam-si (KR) 463-824

( * ) Notice: Subject to any disclaimer, the term of this patent is extended or adjusted under 35 U.S.C. 154(b) by 469 days.

(21) Appl. No.: 11/949,260

(22) Filed: Dec. 3, 2007

(65) Prior Publication Data
US 2008/0088491 A1 Apr. 17, 2008

Related U.S. Application Data

(62) Division of application No. 10/549,994, filed as application No. PCT/KR2004/000575 on Mar. 17, 2004, now Pat. No. 7,339,498.

(30) Foreign Application Priority Data

Mar. 17, 2003 (KR) .................. 10-2003-0016368
Mar. 17, 2003 (KR) .................. 10-2003-0016369
Apr. 1, 2003 (KR) .................. 10-2003-0020401
Apr. 1, 2003 (KR) .................. 10-2003-0020402

(51) Int. Cl.
*G06F 3/00* (2006.01)
(52) U.S. Cl. .................. 341/22; 345/168; 345/169
(58) Field of Classification Search .................. None
See application file for complete search history.

(56) References Cited

U.S. PATENT DOCUMENTS 5,408,060 A * 4/1995 Muurinen .................. 200/314

6,643,371 B2 * 11/2003 Mager .................. 379/355.07
7,216,588 B2 5/2007 Suess

FOREIGN PATENT DOCUMENTS

| KR | 20010036070 A | 5/2001 |
| KR | 20010077631 A | 8/2001 |
| KR | 1020010075865 A | 8/2001 |
| KR | 20020044105 A | 6/2002 |
| KR | 1020020059231 A | 7/2002 |
| KR | 1020030000712 A | 1/2003 |

OTHER PUBLICATIONS

PCT International Search Report; PCT/KR2004/000575; Dated May 21, 2004.
PCT International Preliminary Report on patentability; PCT/KR2004/000575; Dated: Oct. 12, 2004.

* cited by examiner

*Primary Examiner*—Brian A Zimmerman
*Assistant Examiner*—Hung Q Dang
(74) *Attorney, Agent, or Firm*—Cantor Colburn LLP

(57) ABSTRACT

The present invention relates to character arrangements, input methods and input device. More particularly, the present invention relates to Korean, English and symbols arrangements that are effectively arranged on a limited number of buttons, input methods using the character arrangements and input device thereof. The present invention provides fundamental and efficient character arrangements that can be applied to various input methods so that the user who is accustomed to another input method can input characters with the character arrangement of the present invention fast and efficiently.

21 Claims, 7 Drawing Sheets

FIG. 1
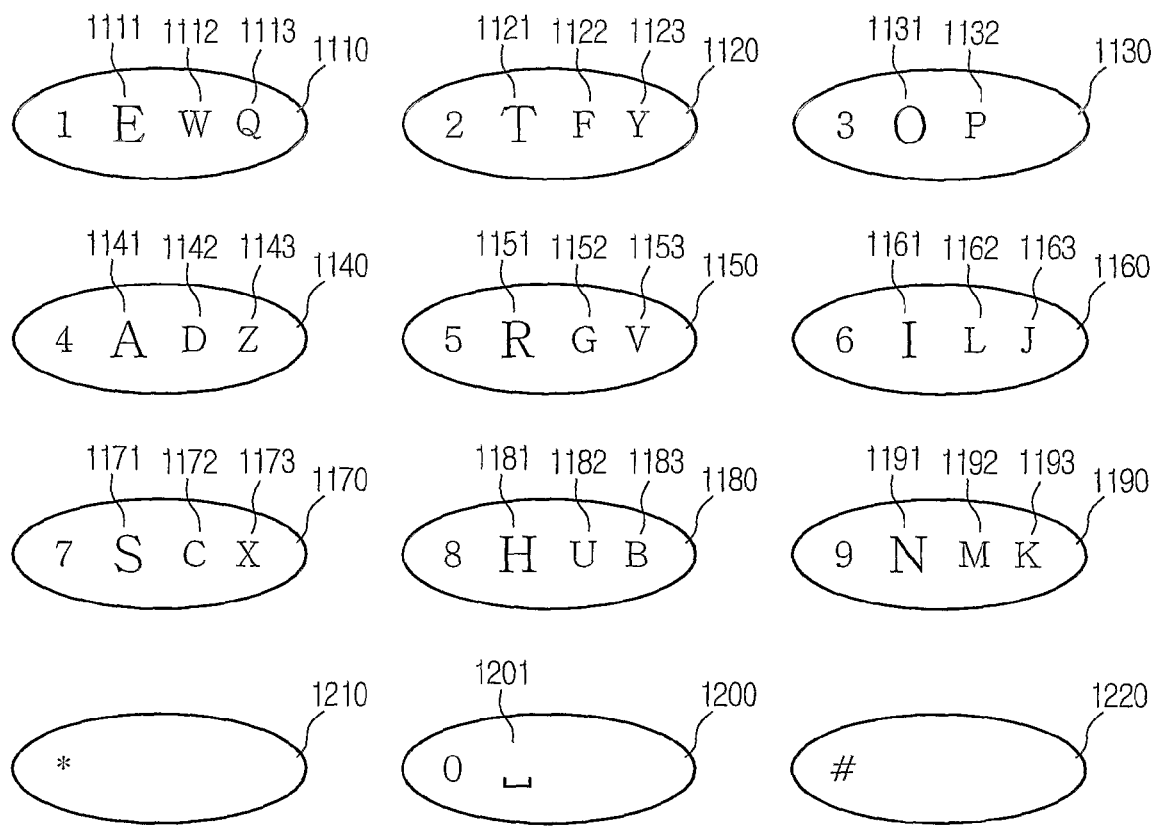
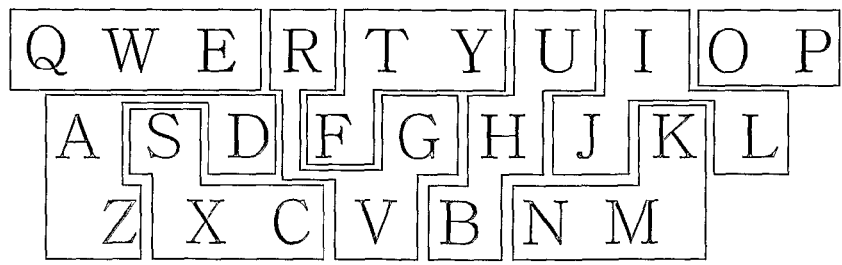

FIG. 4

| CATEGORY | METHOD | CHARACTER | | | SEPARATOR | NUMERALS | SYMBOLS | | |
|---|---|---|---|---|---|---|---|---|---|
| | | 1 | 2 | 3 | | | 1 | 2 | 3 |
| + | M1 | b | bb | bbb | #, wait, → | b~ | *b | *bb | *bbb |
| + | M2 | b | bb | bbb | #, wait, →, b~ | bbbb | *b | *bb | *bbb |
| ○ | D | b | *b | #b | X | | | | |
| ○ | H1 | b | bb | *b | #, wait, → | | | | |
| + | H2 | b | bb | *b, #b | X | | | | |
| ○ | F1 | .b | b~ | *b, #b | wait, → | #~b~ | #b~ | *b~ | *~b~ |
| + | F2 | b | b~ | bb | #, wait, → | bbb | *b | *b~ | *bb |
| + | P1 | b | b~ | b,↗ | X | b→ | b↗ | b↙ | b↑ |
| + | P2 | b | b↗ | b | X | b→ | b↗ | b↙ | b↑ |

CHARACTER ARRANGEMENTS, INPUT METHODS AND INPUT DEVICE

CROSS REFERENCE TO RELATED APPLICATIONS

This application is a divisional application of U.S. application Ser. No. 10/549,994 filed Sep. 19, 2005 now U.S. Pat. No. 7,339,498, which is the U.S. National Stage of application PCT/KR2004/000575 having an International Filing Date of Mar. 17, 2004, which claims priority to and the benefit of Korean Patent Application No. 10-2003-0016368 filed on Mar. 17, 2003, Korean Patent Application No. 10-2003-0016369 filed on Mar. 17, 2003, Korean Patent Application No. 10-2003-0020401 filed on Apr. 1, 2003, and Korean Patent Application No. 10-2003-0020402 filed on Apr. 1, 2003, all of which are incorporated by reference herein in their entirety

TECHNICAL FIELD

The present invention relates to character arrangements, input methods and input device. More particularly, the present invention relates to Korean, English and symbols arrangements that are effectively arranged on a limited number of buttons, input methods using the character arrangements and input device thereof.

BACKGROUND ART

Up to recently, many input methods and character arrangements have been proposed to support 'character inputting' on portable devices such as cellular phone, PDA, remote controller, both having a limited number of buttons. But, since the portable device was not made originally for inputting characters and the function of inputting character was just added later to enhance its performance, it is more uncomfortable than PC keyboard. The portable device adopts 3×4 arranged buttons or alphanumeric keypads as an input means. The alphanumeric keypad has a limited number of buttons less than the PC keyboard. It is conventional to assign more than two characters on single button in order to overcome this limitation such that the user must push more than at least two buttons to select a character to be inputted.

Up to now, various character arrangements, input methods and input devices have been developed to improve the efficiency of inputting characters by using alphanumeric keypad. Although some of developed methods can enhance the input speed and the user convenience, there is a burden that the user is compelled to learn the new character arrangement. Namely, the all of developed methods bring a new character arrangement or an increase in buttons. Thus, in order to adopt a new input method, the user has to be acquainted with the input method and the character arrangement at the same time, and the manufacturer has to make some changes in the structure of portable device, especially in the number of buttons. Since the user hesitates to buy a portable device with unaccustomed input method, if only one of input method and character arrangement is changed, the burden will be smaller. Especially, from the user's point of view, it needs more time to learn the character arrangement than the input method. It means that the manufacturer can apply various input methods to the portable device without changing the accustomed character arrangement and the user can select input method fitting for himself.

DESCRIPTION OF DRAWINGS

FIG. 1 shows English character arrangement according to the present invention.

FIG. 4 shows a table of character input methods that can be applied to the character arrangement according to the present invention.

TECHNICAL PROBLEM

Figure 2:
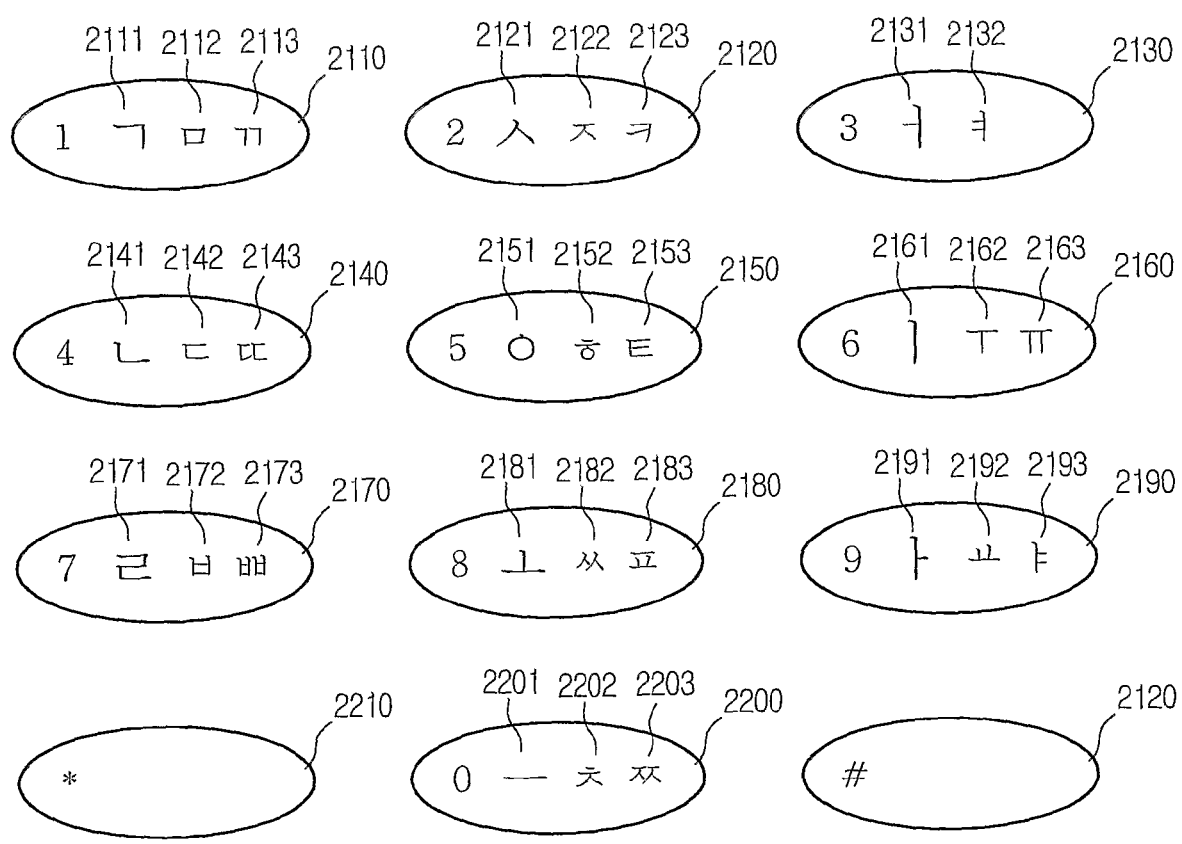
FIG. 2 shows Korean character arrangement according to the present invention.

Accordingly, it is an object of the present invention to provide fundamental and efficient character arrangements that can be applied to various input methods so that the user who is accustomed to another input method can input characters with the character arrangement of the present invention fast and efficiently.

Another object of the present invention is to provide new input methods that can be applied to an existing character arrangement as well as the those of the present invention so that the user who is accustomed to one of the existing character arrangements can input characters by the input methods of the present invention easily.

TECHNICAL SOLUTION

According to the one aspect of the present invention, there is provide a keypad consisting of plural buttons for user to input characters manually, comprising: a first button to a twelfth button being arranged in 3×4 array, a first character set comprising characters of high frequency, being assigned to at least one of said first button to said twelfth button as a first character, a second character set comprising characters of middle frequency, being assigned to at least one of said first button to said twelfth button as a second character, and a third character set comprising characters of low frequency, being assigned to at least one of said first button to said twelfth button as a third character, wherein the character included within said first character set is selected by pushing a single key and the character included within said second character set and said third character set are selected by a predetermined input method, wherein said first character set to said third character set are assigned to one of said first button to said twelfth button in consideration of inputting characters by both hands.

According to another aspect of the present invention, there is provided a method for inputting characters by selecting one among a first characters to a third characters on a 3×4 arrayed keypad in which at least one of the first characters to the third characters is assigned to at least one of a first button to a twelfth button, respectively and the eleventh button and the twelfth button work as a left shift key and a right shift key respectively, comprising: detecting that one among twelve buttons is pushed, determining whether or not one of a left shift flag and a right shift flag is set, outputting the second character or the third character of the pushed button on the basis of a predetermined rule if one of the left shift flag and the right shift flag is set, determining whether or not the pushed button is one of the left shift key and the right shift key if none of the left shift flag and the right shift flag is set, setting one of the left shift flag and the right shift flag if the pushed button is one of the left shift key and the right shift key, and outputting the first character of the pushed button if the pushed button is none of the left shift key and the right shift key.

According to still another aspect of the present invention, there is provided a method for inputting character by selecting one among a first characters to a third characters on a 3×4 arrayed keypad in which at least one of the first characters to the third characters is assigned to at least one of a first button to a twelfth button respectively and the eleventh button and the twelfth button work as a shift key, comprising: determining a long push or a short push when one among twelve buttons is pushed, determining whether or not a shift flag corresponding to the shift keys is set, outputting the second character or the third character of the pushed button on the basis of a predetermined rule if the shift flag is set, determining whether or not the pushed button is the shift key if the shift flag is not set, setting the shift flag if the pushed button is the shift key, and outputting one corresponding to the long push or the short push among the first character to the third character of the pushed button on the basis of the predetermined rule if the pushed button is not the shift key.

According to still another aspect of the present invention, there is provided a method for inputting characters by selecting one among a first characters to a third characters assigned to one of a first button to a twelfth button by a number of button push, comprising: determining a long push or a short push when one among twelve buttons is pushed, outputting one among the first character to the third character corresponding to the number of button push in the case of the short push, determining whether or not the former button being pushed just prior to the long-pushed button is same as the long-pushed button in the case of the long push, separating the long-pushed button from the former button by inserting a separator if they are same, and separating the long-pushed button from the former button by inserting a space if they are not same.

According to still another aspect of the present invention, there is provided a method for inputting characters by selecting one among a first characters to a third characters on a 3×4 arrayed keypad in which at least one of the first characters to the third characters is assigned to at least one of a first button to a twelfth button, comprising: determining a direction of a line longer than a predetermined length when one among twelve buttons is pushed, outputting the second character or the third character of the pushed button corresponding to the line direction on the basis of a predetermined rule, determining a long push or a short push if no line direction exists on the selected button, and outputting one corresponding to the long push or the short push among the first character to the third character of the pushed button on the basis of the predetermined rule.

According to still another aspect of the present invention, there is provided a method for inputting characters by selecting one among a first characters to a third characters on a 3×4 arrayed keypad in which at least one of the first characters to the third characters is assigned to at least one among a first button to a twelfth button, comprising: determining a long push or a short push when one among twelve buttons is pushed, outputting one corresponding to the long push from the second character and the third character of the pushed button on the basis of the predetermined rule in the case of long push, determining whether or not the button is successively pushed in the case of short push, outputting one corresponding to the successive push from the second character and the third character of the pushed button on the basis of the predetermined rule in the case of the successive push, and outputting the first character of the pushed button if the button is not successively pushed.

According to still another aspect of the present invention, there is provided a method for inputting a second character in a first mode without changing mode on a 3×4 arrayed keypad where a first character that can be inputted in the first mode and the second character that can be inputted in a second mode are assigned to, comprising: detecting a first button input in the first mode, wherein the first button input is one selected from a group consisting of a shift key, a long push, a short push and combination of them, wherein the shift key is one selected from a group consisting of button * and button # on the keypad, detecting a second button input in the first mode, wherein the second button input is one selected from a group consisting of a successive push, a long push, a short push and combination of them, and outputting the second character that is predetermined according to the combination of the first button input and the second button input, wherein the selectable combination of the first button input and the second button input is assigned in the first mode.

According to still another aspect of the present invention, there is provided a device for inputting character, comprising: a keypad, in which a first button to a twelfth button are arrayed in 3×4 matrix, at least one among a first character to a third character is assigned to one among the first button to the twelfth button, and the eleventh button and the twelfth button work as a shift key, an input processor for detecting which button is pushed and determining a long push or short push of the detected button, a button processor for selecting one corresponding to the long-pushed button or the short-pushed button among the first character to the third character by checking a shift flag's state corresponding to the shift key, and a memory for working as the shift flag that is set or reset by said button processor and storing the first characters to the third characters that are assigned to said each button.

MODE FOR INVENTION

The character arrangements of the present invention are for a keypad consisting of twelve buttons arranged in 3×4 matrix (hereinafter, abbreviating as 'keypad') so that no additional button is needed. The character arrangements of the present invention are designed after calculating the appearance frequencies of each character: (1) to minimize the number of button push; (2) to maximize the use of both hands; and (3) to help a user learn easily. In conclusion, characters are arranged to each button in order to make it possible to input characters fast when the user gets used to the character arrangement of the present invention through a proper practice to memorize it.

Basically, one character to three characters (the first character, the second character, the third character) is/are assigned to each button, and the first characters are used more frequently than the second characters and the second characters are used more frequently than the third characters. In this character arrangement, the buttons to be pushed are equally distributed when a word or sentence is inputted. Also, all characters can be marked on each button for simplification.

To describe the present invention clearly, each button will be arrayed and named on the keypad in following manner.

| [button 1] | [button 2] | [button 3] |
| [button 4] | [button 5] | [button 6] |
| [button 7] | [button 8] | [button 9] |
| [button *] | [button 0] | [button #] |

FIG. 1 shows English arrangement according to the present invention and the relationship with QWERTY keyboard.

Namely, the English arrangement follows QWERTY in large part for the user to learn fast through the relationship with QWERTY.

In the English arrangement, two or three characters are assigned to [button 1] 1110~[button 9] 1190 and space is assigned to [button 0] 1200. The first character 1111~1191, the second character 1112~1192 and the third character 1113~1193 are assigned to [button 1] 1110~[button 9] 1190 respectively, and among these buttons, only [button 3] has the first character 1131 and the second character 1132 without the third character.

Set of the first characters includes nine characters having highest appearance frequency among 26 characters, set of the second characters includes nine characters having middle appearance frequency, and set of third characters includes eight characters having lowest appearance characters. Here, several exceptions that do not affect an efficiency of the character arrangement can be made in order to be similar to QWERTY. These exceptions will be described in detail.

The characters included in the first character set are assigned to [button 1] 1110~[button 9] 1190 as the first character and regardless of input method, it is preferable that the first characters are inputted as a default when the button is selected. The characters included in the second and third character set are assigned to [button 1] 1110~[button 9] 1190 as one of the second character 1112~1192 and the third character 1113~1193 respectively, and can be selectively inputted according to the input method that is applied to the character arrangement. Table 1 shows appearance frequencies for classifying 26 characters into the first character set to the third character set. The appearance frequencies may be altered little by little according to the statistic data, but have similar ratio and order so some differences can be disregarded.

The appearance frequency becomes higher from the right side to the left side, and characters in [ ] have similar frequency. From Table 1, it cab be appreciated that space is used most frequently. Thus, space is assigned to [button 0] 1200 because it locates at bottom of keypad similarly to the space-bar of PC keyboard.

Next, the characters included in the first character set to the third character set are assigned to each button respectively on the basis of QWERTY. The reason of assigning characters similar to QWERTY is because most of users are already familiar with QWERTY so they can be accustomed to the character arrangement with ease.

Firstly, in consideration of the position in QWERTY and the hand to push (namely, right hand or left hand), nine characters (E T A O I N S R H) in the first character set are assigned to [button 1] 1110~[button 9] 1190 respectively. 'E' 'A' 'S', which locate on the left side of QWERTY and are pushed by left hand, are assigned to [button 1] 1110, [button 4] 1140, [button 7] 1170; 'O' 'I' 'N' locating on the right side of QWERTY, are assigned to [button 3] 1130, [button 6] 1160, [button 9] 1190; and 'T' 'R' 'H' locating in the center of QWERTY, are assigned to [button 2] 1120, [button 5] 1150, [button 8] 1180. Here, the positions of 'T' and 'R' can be exchanged and positions of 'A' and 'S' can be also exchanged.

Secondly, as shown in FIG. 1, characters neighboring the first character in QWERTY are selected as the second character and the third character from the second character set and the third character set. In this manner, nine characters (D L U M C F P W G) in the second character set and eight characters (Y B V K J X Q Z) in the third character set are assigned to [button 1] 1110~[button 9] 1190. Here, the second character set and the third character set can be defined differently from the original appearance frequency in order to become similar

TABLE 1

| statistic data 1 | | statistic data 2 | | statistic data 3 | |
|---|---|---|---|---|---|
| character | frequency(%) | character | frequency(%) | character | frequency(%) |
|  |  | space | 18.59 |  |  |
| E | 14.00 | E | 10.31 | E | 12.77 |
| T | 9.85 | T | 7.96 | T | 8.55 |
| A | 7.49 | A | 6.42 | O | 8.07 |
| O | 7.37 | O | 6.32 | A | 7.78 |
| S | 6.95 | I | 5.75 | N | 6.86 |
| N | 6.74 | N | 5.74 | I | 6.67 |
| I | 6.65 | S | 5.14 | R | 6.51 |
| R | 6.14 | R | 4.84 | S | 6.22 |
| H | 4.22 | H | 4.67 | H | 5.95 |
| D | 3.62 | L | 3.21 | D | 4.02 |
| L | 3.57 | D | 3.17 | L | 3.72 |
| C | 3.54 | U | 2.28 | U | 3.08 |
| M | 3.39 | F | 2.08 | C | 2.96 |
| U | 3.00 | M | 1.98 | M | 2.88 |
| P | 2.43 | W | 1.75 | P | 2.23 |
| F | 2.18 | Y | 1.64 | F | 1.97 |
| G | 1.74 | G | 1.52 | Y | 1.96 |
| W | 1.69 | P | 1.52 | W | 1.76 |
| Y | 1.64 | C | 1.28 | G | 1.74 |
| B | 1.29 | B | 1.27 | B | 1.41 |
| V | 1.16 | V | 0.83 | V | 1.12 |
| K | 0.47 | K | 0.49 | K | 0.74 |
| X | 0.28 | X | 0.13 | J | 0.51 |
| J | 0.27 | J | 0.08 | X | 0.27 |
| Q | 0.26 | Q | 0.08 | Z | 0.17 |
| Z | 0.04 | Z | 0.05 | Q | 0.08 |

According to Table 1, the order of characters corresponding to the appearance frequency is as follows: space E T [A O] [I N S R] H [D L] [U M C] [F P] [Y W G] B V K[J X Q Z]

to QWERTY. Since characters having high frequency are important and their order is determined exactly but the order of characters having low frequency cannot be determined exactly, so they can be changed without affecting an efficiency of the character arrangement. In the light of mean of three statistic data in Table 1, for example, although 'Y' is more frequently used than 'W' or 'G', 'Y' is the third character and 'W' 'G' are the second character. In short, the characters having similar frequency, especially low frequency, can be either of the second character and the third character.

In FIG. 1, the second character and the third character of [button 2] 1120, [button 5] 1150 and [button 8] 1180 can be exchanged according to above described principle and manner.

[button 2]=[T U Y]
[button 5]=[R F G]
[button 8]=[H B V]
or
[button 2]=[T U F]
[button 5]=[R Y G]
[button 8]=[H B V]

With the aforementioned English arrangement applied to the keypad, the user can input the character in the left side, which is inputted by the left hand in QWERTY, by left thumb and the character in the right side, which is inputted by the right hand, by right thumb. Since the position of characters and the input efficiency are similar to those of QWERTY keyboard, those who are acquainted with QWERTY can learn with ease. Also, the input efficiency relating to the appearance frequency is considered, so it help the user to input characters efficiently.

The varieties of character in French language, the German language, the Italian, the Portuguese, the Swedish, the Norwegian, the Dutch and the like can be inputted by repeatedly pushing an additional transformation button after inputting a character. For example, when inputting 'A' and then pushing the transformation button, then 'A' will be changed Á→Â→À→Ä→Ã→Å. Also, some characters that do not exist in English alphabets such as 'β' in the German language can be assigned to [button 3] 1130 as the third character.

FIG. 2 shows Korean character arrangement according to the present invention.

In the Korean character arrangement, two or three of consonant and vowel are assigned to [button 1] 2110~[button 0] 2200 and space is assigned to [button 0] 1200. The first character 2111~2201, the second character 2112~2202 and the third character 2113~2203 are assigned to [button 1] 2110~[button 0] 2200 respectively, and among these buttons, only [button 3] 2130 has the first character 2131 and the second character 2132 without the third character.

The number of characters being assigned to each button is 29 and can be classified as follows:

14 basic consonants: ㄱ ㄴ ㄷ ㄹ ㅁ ㅂ ㅅ ㅇ ㅈ ㅊ ㅋ ㅌ ㅍ ㅎ

5 double consonants: ㄲ ㄸ ㅃ ㅆ ㅉ

10 basic vowels: ㅏ ㅑ ㅓ ㅕ ㅗ ㅛ ㅜ ㅠ ㅡ ㅣ

11 composite consonants (ᆪ ᆬ ᆭ ᆰ ᆱ ᆲ ᆳ ᆴ ᆵ ᆶ ᆹ) and 11 composite vowels (ㅐ ㅒ ㅔ ㅖ ㅘ ㅙ ㅚ ㅝ ㅞ ㅟ ㅢ) can be inputted by combining each consonant or vowel according to the character combination rule of standard PC keyboard.

Set of the first characters includes ten characters having highest appearance frequency among 29 characters (consonants and vowels), set of the second characters includes ten characters having middle appearance frequency and set of third characters includes nine characters having lowest appearance characters. Here, several exceptions that do not affect an efficiency of the character arrangement can be made in order to be similar to QWERTY. These exceptions will be described in detail.

The characters included in the first character set are assigned to [button 1] 2110~[button 0] 2200 as the first character and regardless of input method, it is preferable that the first characters are inputted as a default when the button is selected. The characters included in the second and third character set are assigned to [button 1] 2110~[button 0] 2200 as one of the second character 2112~2202 and the third character 2113~2203 respectively, and can be selectively inputted according to the input method that is applied to the character arrangement. Table 2 shows appearance frequencies for classifying 29 characters into the first character set to the third character set. The appearance frequencies may be altered little by little according to the statistic data, but have similar ratio and order so some differences can be disregarded.

TABLE 2

| consonant + vowel | | consonant | | vowel | |
| --- | --- | --- | --- | --- | --- |
| character | frequency (%) | character | frequency (%) | character | frequency (%) |
| ㅇ | 11.83 | ㅇ | 11.83 | | |
| ㅣ | 11.07 | | | ㅣ | 11.07 |
| ㅏ | 10.66 | | | ㅏ | 10.66 |
| ㄴ | 8.28 | ㄴ | 8.28 | | |
| ㄱ | 6.95 | ㄱ | 6.95 | | |
| ㄹ | 5.86 | ㄹ | 5.86 | | |
| ㅓ | 5.81 | | | ㅓ | 5.81 |
| ㅡ | 5.57 | | | ㅡ | 5.57 |
| ㅗ | 5.00 | | | ㅗ | 5.00 |
| ㅅ | 3.88 | ㅅ | 3.88 | | |
| ㄷ | 3.56 | ㄷ | 3.56 | | |
| ㅈ | 3.40 | ㅈ | 3.40 | | |
| ㅜ | 3.16 | | | ㅜ | 3.16 |
| ㅎ | 3.01 | ㅎ | 3.01 | | |
| ㅁ | 2.81 | ㅁ | 2.81 | | |
| ㅂ | 2.36 | ㅂ | 2.36 | | |
| ㅕ | 2.05 | | | ㅕ | 2.05 |
| ㅆ | 0.98 | ㅆ | 0.98 | | |
| ㅊ | 0.97 | ㅊ | 0.97 | | |
| ㅌ | 0.58 | ㅌ | 0.58 | | |
| ㅍ | 0.51 | ㅍ | 0.51 | | |
| ㅛ | 0.38 | | | ㅛ | 0.38 |
| ㄸ | 0.26 | ㄸ | 0.26 | | |
| ㅑ | 0.26 | | | ㅑ | 0.26 |
| ㅠ | 0.25 | | | ㅠ | 0.25 |
| ㄲ | 0.24 | ㄲ | 0.24 | | |
| ㅋ | 0.22 | ㅋ | 0.22 | | |
| ㅉ | 0.07 | ㅉ | 0.07 | | |
| ㅃ | 0.06 | ㅃ | 0.06 | | |

According to Table 2, the order of characters corresponding to the appearance frequency is as follows:

Total: ㅇ ㅣ ㅏ ㄴ ㄱ ㄹ ㅓ ㅡ ㅗ ㅅ ㄷ ㅈ ㅜ ㅎ ㅁ ㅂ ㅕ ㅆ ㅊ ㅌ ㅍ ㅛ ㄸ ㅑ ㅠ ㄲ ㅋ ㅉ ㅃ consonant: ㅇ ㄴ ㄱ ㄹ ㅅ ㄷ ㅈ ㅎ ㅁ ㅂ ㅆ ㅊ ㅌ ㅍ ㄸ ㄲ ㅋ ㅉ ㅃ vowel: ㅣ ㅏ ㅓ ㅡ ㅗ ㅜ ㅕ ㅛ ㅑ ㅠ

The appearance frequency becomes higher from the right side to the left side.

The principles for assigning Korean characters to each button can be summarized as follows:

(1) Assign characters having highest frequency as the first character (2) Assign consonants to where a user can input by the left hand and vowels to where the user can input by the right hand for the user who is already acquainted to PC keyboard to learn it with ease (3) Assign characters to the buttons in consideration of the location of consonants and vowels in Korean character (4) The second character and the third character relate to the first character that is already assigned to the button (5) 'ㅣ'is centered because it is combined with 'ㅏ','ㅑ','ㅓ','ㅕ','ㅗ','ㅜ','ㅡ'to make the composite vowels On the basis of the aforementioned principles, the Korean characters are assigned to each button.

Firstly, ten characters (ㅇ ㅣ ㅏ ㄴ ㄱ ㅌ ㅓ ㅡ ㅗ ㅅ) in the first character set are assigned to [button 1] 2110~[button 0] 2200 respectively. 'ㅇ','ㄴ','ㄱ','ㅅ','ㅌ',which locate on the left side of standard PC keyboard and are pushed by left hand, are assigned to [button 5] 2150, [button 4] 2140, [button 1] 2110, [button 7] 2170, [button 2] 2120, which are easy to push by left thumb; 'ㅣ','ㅏ','ㅓ'ㅡ','ㅗ'locating on the right side of standard PC keyboard, are assigned to [button 6] 2160, [button 9] 2190, [button 3] 2130, [button 0] 2200, [button 8] 2180, which are easy to push by right thumb. Since vowel 'ㅣ','ㅏ''ㅓ'locate at right position and vowel 'ㅡ''ㅗ'locate at lower position when they are wrote in Korean character, it is preferable to assign these vowels to the buttons at left side and at lower side of the keypad respectively. Also, in the case of 'ㅆ' that is used as a final consonant more frequently than an initial consonant, it is preferable to assign it to the button at lower side, and in the case of 'ㅈ' that is used as an initial consonant more frequently than a final consonant, it is preferable to assign it to the button at the upper side.

Secondly, as shown in FIG. 2, in order to help a user learn the character arrangement with ease, ten characters (ㄷ ㅊ ㅜ ㅎ ㅁ ㅂㅕ ㅆ ㅋ ㅛ) in the second character set and nine characters (ㅌ ㅍ ㄸ ㅑ ㅠㄲ ㅋ ㅉ ㅃ) in the third character set are assigned to [button 1] 2110~[button 0] 2200 in consideration of the already-assigned first character. Here, the second character set and the third character set can be defined differently from the original appearance frequency for the convenience of the user. In the light of mean of three statistic data in Table 2, for example, although 'ㅌ'is more frequently used than 'ㅛ','ㅌ' is the third character and 'ㅛ'is the second character. In short, the characters having similar frequency, especially low frequency, can be either of the second character and the third character. Also, as there are several similar-figured consonants (ㄱ ㄲ ㅋ, ㄷ ㄸ ㅌ,ㅂ ㅃ ㅍ, ㅅ ㅆ,ㅈ ㅉ ㅊ) or vowels (ㅏ ㅑ,ㅓ ㅕ,ㅗ ㅛ,ㅜ ㅠ) in Korean, it is preferable to assign these characters similar to the first characters as the second character or third character to the buttons close to the first character for a user to easily guess their location.

According to the aforementioned principles, 'ㅈ','ㅆ','ㅊ' of in FIG. 2 can be exchanged as follows:

[button 2]=[ㅅ ㅆ ㅋ]

[button 8]=[ㅗ ㅈ ㅍ]

[button 0]=[ㅡ ㅊ ㅉ]

or

[button 2]=[ㅅ ㅆ ㅋ]

[button 8]=[ㅗ ㅊ ㅍ]

[button 0]=[ㅡ ㅈ ㅉ]

Also, according to the aforementioned principles, [button 6] 2160 and [button 9] 2190 in FIG. 2 can be exchanged as follows:

[button 6]=[ㅏ ㅛ ㅑ]

[button 9]=[ㅣ ㅜ ㅠ]

Figure 3:
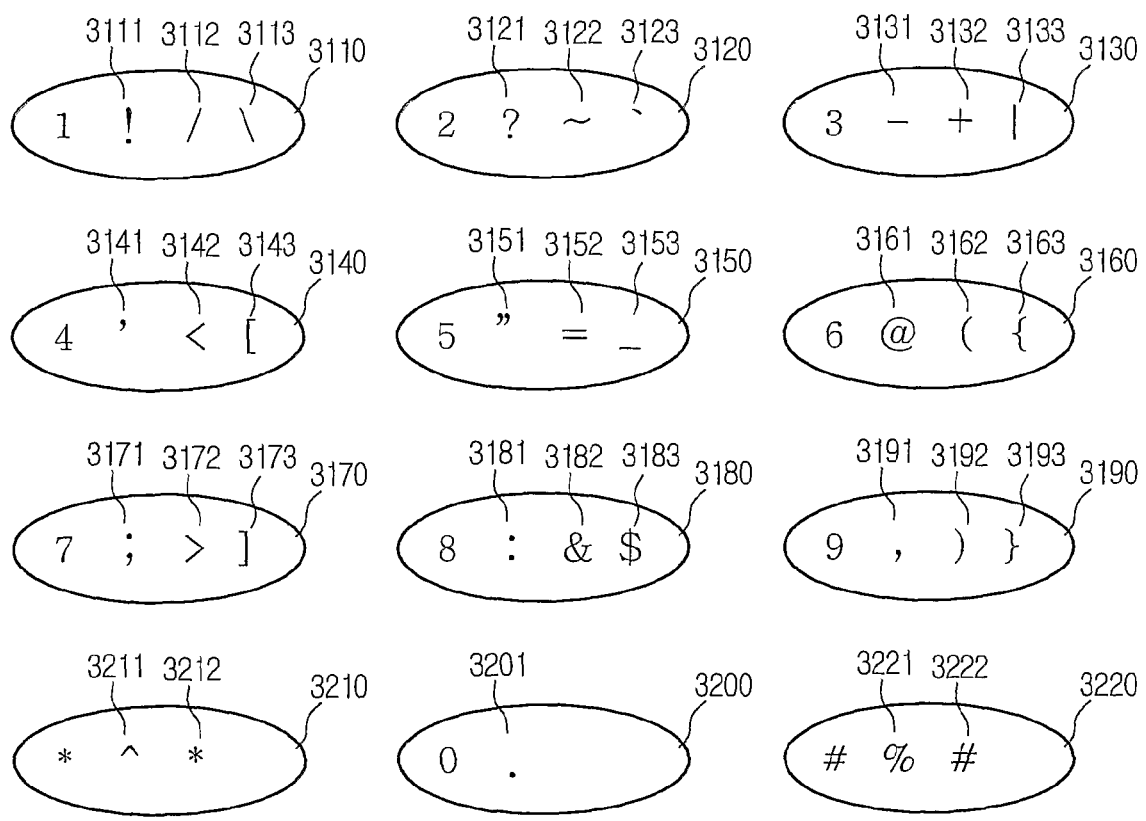
FIG. 3 shows symbol arrangement according to the present invention.

FIG. 3 shows symbol arrangement according to the present invention.

In the symbol arrangement, two or three symbols are assigned to [button 1] 3110~[button #] 3220. The first symbol 3111~3221, the second symbol 3112~3222 and the third symbol 3113~3223 are assigned to [button 1] 3110~[button #] 3220 respectively. Among these buttons, [button 0] 3200 has the first symbol only, and [button *] 3210 and [button #] 3220 have the first symbol and the second symbol only. But, it is possible for a user or a manufacturer to assign new symbols to any one of [button 0] 3200, [button *] 3210 and [button #] 3220.

Set of the first symbols includes twelve symbols, especially punctuation marks, having highest appearance frequency among 32 symbols, set of the second symbols includes eleven symbols having middle appearance frequency and set of third characters includes nine symbols having lowest appearance characters.

The characters included in the first symbol set are assigned to [button 1] 3110~[button #] 3220 as the first symbol and regardless of input method, it is preferable that the first symbols are inputted as a default when the button is selected. The symbols included in the second and third symbol set are assigned to [button 1] 3110~[button #] 3220 as one of the second symbol 3112~3222 and the third symbol 3113~3223 respectively, and can be selectively inputted according to the input method that is applied to the symbol arrangement. Table 3 shows an arrangement of 32 symbols on the basis of (1) similarity to Arabic figures and (2) original location in standard PC keyboard. This arrangement will help a user to memorize easily so that it is possible to efficiently input symbols.

TABLE 3

| button | First symbol | Second symbol | Third symbol | Description |
|---|---|---|---|---|
| 1 | ! | / | \ | Similar to '1' |
| 2 | ? | ~ | ` | Similar to '2' |
| 3 | - | + | \| | Location in PC keyboard |
| 4 | ' | < | [ | Similar to '4' |
| 5 | " | = | _ | Similar to '5' |
| 6 | @ | ( | { | Similar to '6' |
| 7 | ; | > | ] | Similar to '7' |
| 8 | : | & | $ | Similar to '8' |
| 9 | , | ) | } | Similar to '9' |
| 0 | . |   |   | Similar to '0' |
| * | ^ | * |   | Similar to '*' |
| # | % | # |   | Similar to '#' |

The first symbol set includes punctuation marks ! ? - ' " ; : , . and E-mail address symbol @. Symbols having similar figure to Arabic numerals are assigned to numeral button having similar figure or neighboring button to help a user learn easily. But, since - + | locate on the right-upper position of PC keyboard, it is preferable to assign them to [button 3] 3130 locating at same position on the keypad. As symbols are not frequently used, how easy to learn is prior to how frequently used, and then it is preferable to include symbols having highest frequency into the first symbol rather than the second symbol and the second symbol rather than the third symbol.

FIG. 4 shows a table of character input methods that can be applied to the character arrangement according to the present invention. Here, I will indicate pushing [button b] once/twice/three times/four times by b/bb/bbb/bbbb; pushing [button b] long by b~; pushing [button b] after pushing [button *] or [button #] by *b and #b. Especially in the input method for inputting characters by a long push and a short push, if there is no need to distinguish the long push and the short push of [button b], I will indicate [button b] by b-. And, an arrow mark after b will indicate that a line having the predetermined length is drawn toward the direction of the arrow mark on [button b].

To consecutively input at least two different characters being assigned to same button, a separator is needed for completing the current input and separating it from the next input, and the separator may be any one of pushing [button b] once (#), no input for a short time (wait) or pushing right arrow (→). In some input methods, b~ can be used as the separator for implying that new character will be inputted, and it will be described in detail hereinafter. And I indicate X for some input methods that do not use the separator. In these methods, the user does not need to separate between characters so that he/she can concentrate on inputting characters only.

Also, if the current mode is changed from a character mode to a numeral mode, then the numerals can be inputted by b or b-; if the mode is changed to a symbol mode, it is possible to input symbols in the same manner of inputting the first to third character in the character mode. But in FIG. 4, I indicate some input methods (M1, M2, F1, F2, P1, P2) in which the user can input numerals and symbols without changing the current mode.

In FIG. 4, + means the input methods (M1, M2, H2, F2, P1, P2) that new features are combined to the conventional method and to means new input method (F1).

Multitap method (M1, M2) among existing input methods is a representative input method that the character arrangement can be applied to. In Multitap method, characters being assigned to a button can be selected by pushing once to three times (b, bb, bbb). Multitap is widely used at present, and many enhanced Multitap methods have been introduced. The representative example of enhanced Multitap is 'Chun-Ji-In' in Korea. M1 and M2 in FIG. 2 are kinds of enhanced Multitap. Especially a user can input symbols by pushing *b, *bb, *bbb in the character mode. Also the long pushing [button b] can be used as the separator in M2.

In detail, when inputting of current character is completed by last pushing [button b], b~ is used for the start of inputting next character in same button. Namely, by pushing b~, b~b, b~bb, a user can select the first to third character of [button b] as the next character. Additionally, if the user pushes b~ even though he/she can start to input next character just by pushing b, a space can be inserted before inputting the character corresponding to [button b]. This process can help the user to separate following word from previous word without pushing another button so that the input efficiency increases.

In order to input symbols without changing the character mode to the symbol mode or using a popup menu, additional combinations of button can be defined. It is preferable that the additional button combinations are different from the original button combinations that are defined for selecting the first to the third character in the character mode. In the same manner, symbols in the character mode, capital letter in the small letter mode, or Roman letter in Korean mode can be inputted without changing the current mode.

In dual shift method (D), the second character and the third character are selected by using [button *] and [button #] as a left shift key and a right shift key respectively. For example, when the character to be inputted is the second character, [button *] is pushed firstly and then [button b], to which the character is assigned as the second character, is pushed (*b). In the same manner, when the character to be inputted is the second character, [button #] is pushed firstly and then [button b], to which the character is assigned as the third character, is pushed (#b). Of course, the second character and the third character can be selected by #b and *b. Especially, since the vowels and consonants are separated to be inputted by the right thumb and the left thumb in the Korean arrangement of the present invention, so it is easy to push [button *] by the left thumb and [button #] by the right thumb. From this feature, inputting #b if the second character is consonant and *b if the second character is vowel are more efficient because the user will use hands equally. Thus, if the third character is consonant, then the user will input *b; if the third character is vowel, then the user will input #b.

Hybrid method (H1, H2) is combination of Multitap and dual shift method, and the user can select the third character by successively pushing shift key and [button b] rather than pushing [button b] three times. When [button #] is used as a separator (H1), the third character can be selected by *b; when [button #] is not used as a separator (H2), the third character can be selected by either of *b and #b. That is, [button *] and [button #] are not distinguished and work as a same shift key in H2 method. It may help user select either of * and # at his convenience. Here, the methods of selecting the second and the third character will be exchanged.

T efficient input methods (F1, F2) for the character arrangement of the present invention distinguish the time of pushing button: the first character is selected by pushing [button b] shortly, or short push (b); the second character is selected by pushing [button b] long, or long push (b); the third character is selected by successively pushing a shift key and [button b] (*b or #b) in F1 method; and the third character is selected by pushing [button b] twice (bb) in F2 method. In F2 method, the ways of selecting the second and the third character will be exchanged. As shown in FIG. 4, both F1 and F2 methods can input numerals and symbols in the character mode without changing mode, user can select numerals or symbols by pushing *b, *bb, *bbb in the same manner of M1 and M2 methods or *b, *b~, *bb by using F1 method. Especially, as the numeral mode and the symbol mode can be combined in F1 method, numerals and symbols can be inputted by b, #b, *b, b~ in this combined mode.

Since F1 method does not need a separator, 10 combinations of [button b] (b, b~, *b, #b, *b~, #b~, *~b, #~b, *~b~, #~b~) are available. But in order to increase the input efficiency, it is preferable not to determine whether the following button is long pushed or short pushed if [button *] or [button #] is long pushed. In short, *~b is equivalent to *~b~ and #~b is equivalent to #~b~. As described above, these will be indicated by *~b- and #~b-. Also in order to increase the input efficiency and convenience, 7 combinations of [button b] (b, b~, *b=#b, *b~, #b~, *~b-, #~b-) are available if [button *] and [button #] work as same shift key like PC keyboard. In this case, as shown in FIG. 4, b, b~, *b=#b are used for inputting characters and *b~, #b~, *~b-, #~b- are used for inputting numerals and symbols in the character mode. When F1 method is applied to the character arrangement of the present invention, 94%~95% of English alphabets and 97%~98% of consonants and vowels in Korean can be inputted by one button push (b, ~b). Of course, this statistic data may be changed in other languages using Roman based alphabets other than English.

P1 method is modified from F1 method: since user can draw a line with stylus pen in a portable device such as PDA, drawing a line longer than the predetermined length with direction (e.g., leftward or left-downward, etc) on [button b], instead of successively pushing [button *]/[button #] and [button b], is combined to the function of distinguishing long/short push. P2 method is modified from the dual shift method:

*b is replaced by drawing a line longer than the predetermined length with leftward or left-downward; #b is replaced by drawing a line longer than the predetermined length with rightward or right-downward. Both P1 and P2 method do not need a separator, and it is available to support numeral and symbol input in the character mode with ease. That is, a user can input numerals by drawing a down-directed line on [button b] and three different symbols by drawing three lines having different directions (right-upward, upward, left-upward). Here, the way of selecting the second and the third character can be exchanged in both P1 and P2 method.

In the devices adapting to where the input method of the present invention is applied, it is preferable to equip an additional mode button for changing mode. It is preferable that the mode button will work differently in English mode, especially in the capital letter mode and the small letter mode. When the mode button is pushed in non-English mode, then the current mode is changed to small letter mode. When the mode button is pushed in English mode, either of the capital letter mode and the small letter mode, then the current mode is changed to the other English mode like pushing CapsLock button in PC keyboard. Regardless of English mode or non-English mode, if the mode button is long pushed, then the current mode is changed to the One-Time-CapsLock mode in where only the first character is inputted as a capital letter and the mode is changed to the small letter mode.

Figure 5:
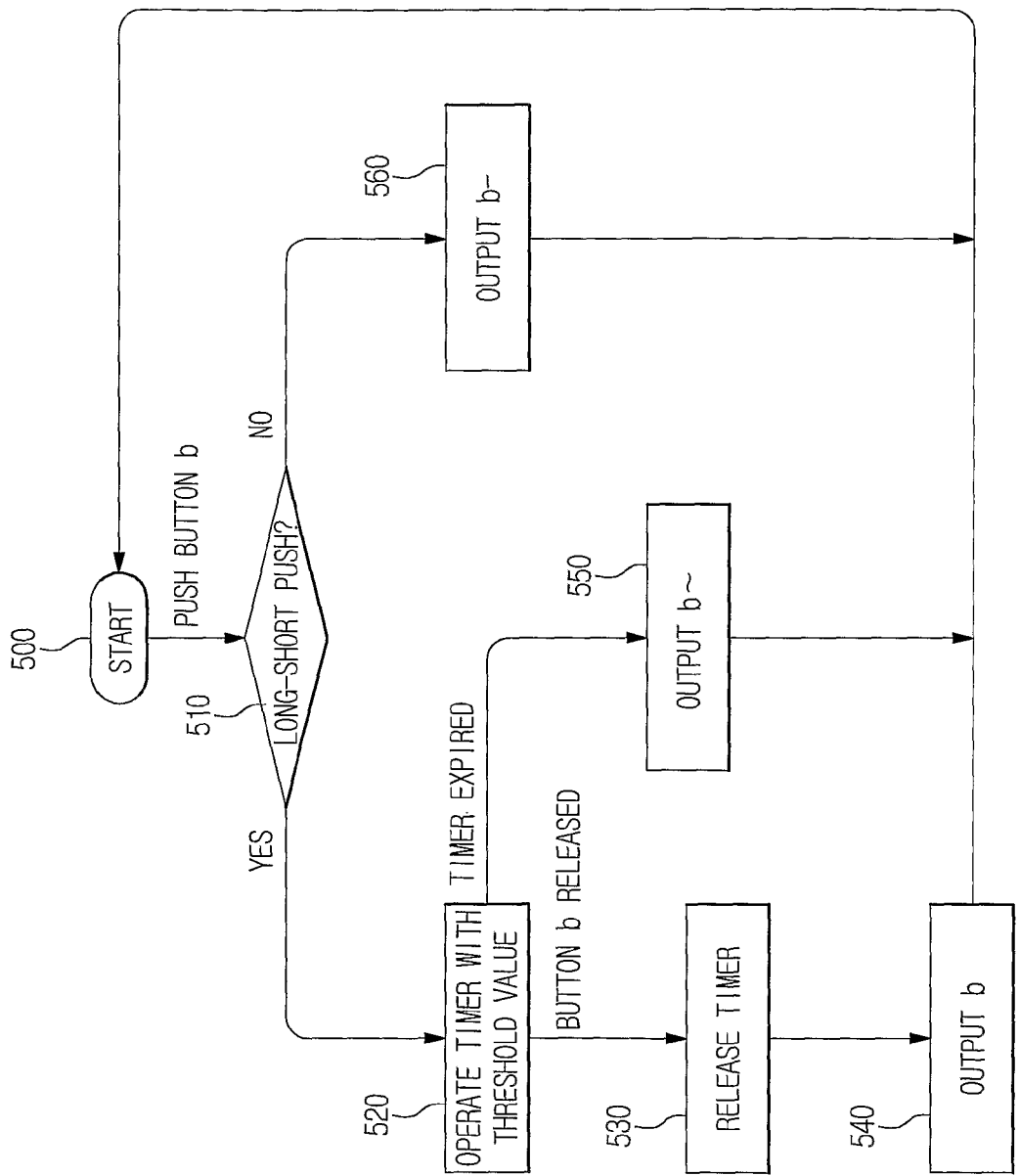
FIG. 5 is a flowchart for distinguishing a long-pushed button and a short-pushed button according to the present invention.

FIG. 5 is a flowchart for distinguishing a long-pushed button (b~), a short-pushed button (b) and b- that is not needed to distinguish. Here, threshold value for distinguishing long or short is determined by the manufacturer, but a user according to the user's dexterity can also change this value. Novice can enlarge this value and the user who is acquainted to the long-short push can shorten it in order to reduce the input time.

At step 500, if the user pushes [button b], then it is determined that it is needed to distinguish long-short push at step 510. For example, if the shift flag is set to long push, then it is not needed to distinguish long-short push for the following button push. But, since this is only for preventing the lowering of input speed, it is possible to distinguish long-short push for the following button push in other embodiments.

At step 520, if long-short push must be distinguished, a timer is operated by the predetermined threshold value. Here, the threshold value is a reference for distinguishing long push and short push, and can be changeable by user.

When [button b] is released, the timer is stopped at step 530 and [button b] is distinguished as short push (b) at step 540.

When the timer is expired, [button b] is distinguished as long push (b~) at step 550.

If there is no need to distinguish long-short push, [button b] is distinguished as b- at step 560.

Figure 6:
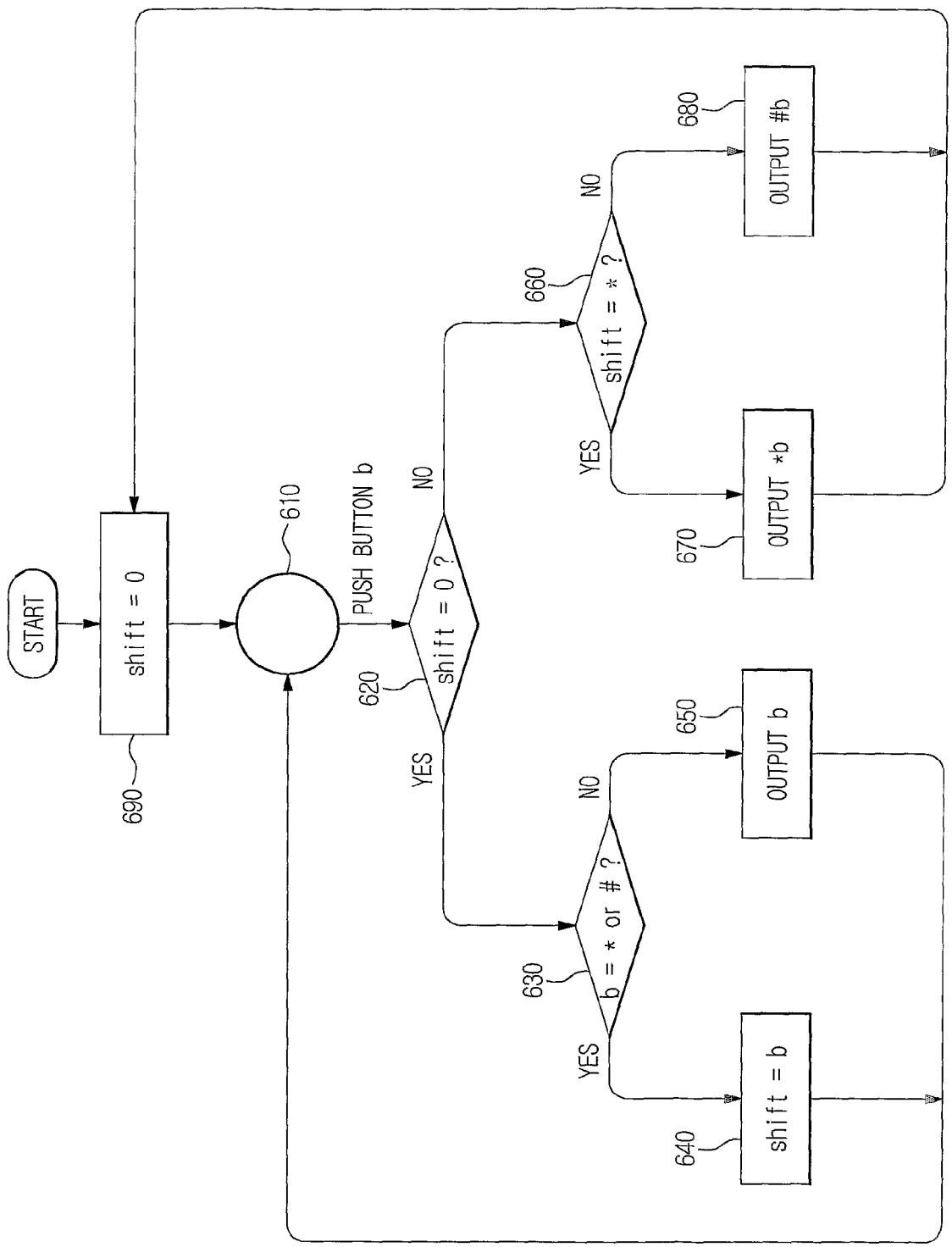
FIG. 6 is a flowchart for using a shift button according to the present invention.

FIG. 6 is a flowchart for distinguishing [button b] without shift key (b) and [button b] with shift key (*b, #b). Since the distinction between b and b~, * and *~, and # and #~ are already done in FIG. 5, so the output of FIG. 5 can be used as the input of FIG. 6.

At step 610, the data corresponding to [button b] (b) is inputted. Here, the actual data is one of b, b~, b-.

At step 620, the state of shift flag is checked. If the shift flag is set, then the following step will be 630; otherwise, the following step will be 660.

At step 630, it is determined whether [button b] is [button *] or [button #]. If [button b] is one of [button *] and [button #] according to the determination, then the shift flag is set by b at step 640. If [button b] is none of [button *] and [button #], b is outputted at step 650.

At step 660, data stored in the shift flag is read, and if the shift flag is set by *, *b is outputted at step 670, and if the shift flag is set by #, then #b is outputted at step 680. At step 690, the shift flag is reset.

Figure 7:
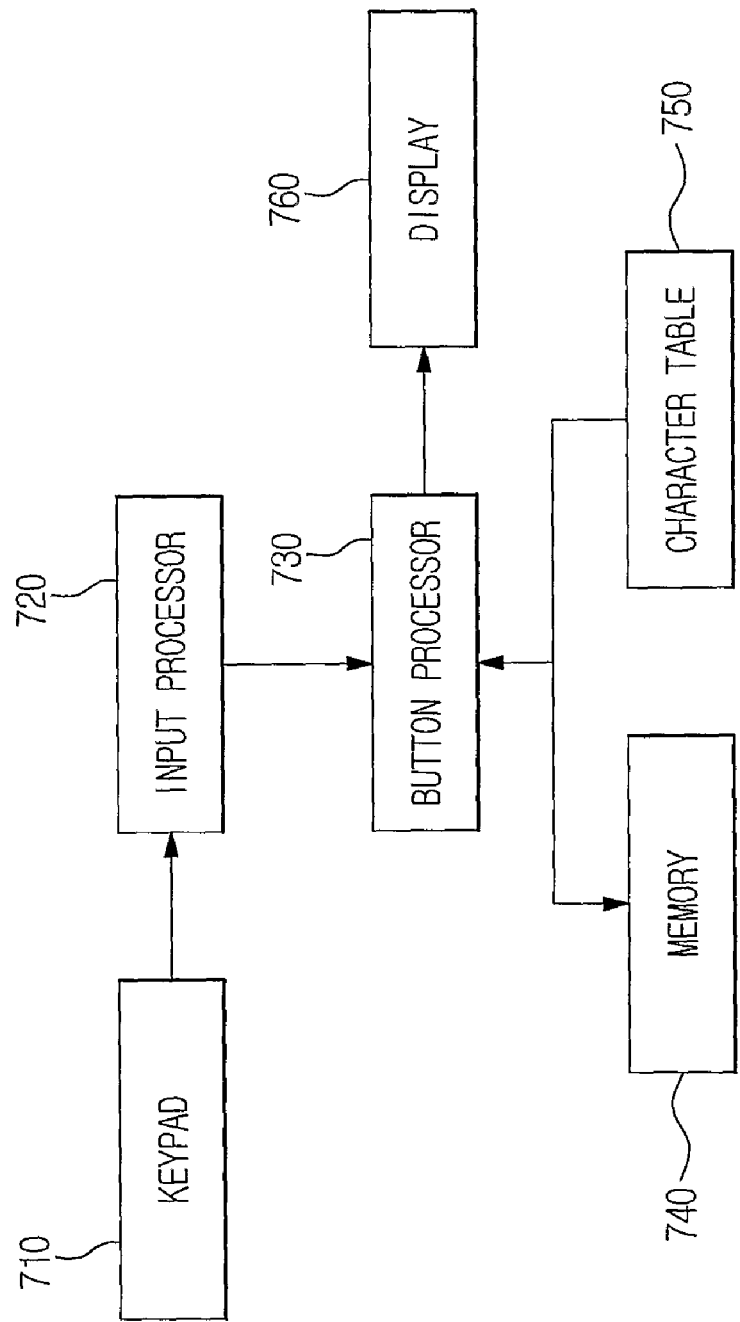
FIG. 7 is a block diagram of the input device according to the present invention.

The character input device in FIG. 7 for inputting characters by F1 method of FIG. 4 comprises a keypad 710, an input processor 720, a button processor 730, a memory 740 and a character table 750.

Keypad 710 consists of [button 1]~[button 0], [button *], [button #], and at least one of the first character to the third character is assigned to each button.

Input processor 720 determines which button is selected on receiving a signal relating to the pushed button, measures the time how long the button is pushed to determine long push or short push, and outputs long or short pushed button data. In short, input processor 720 performs the process in FIG. 5 to output short push (b), long push (b~) and b-. In addition, the input processor 720 can recognize the direction of line in any portable device having a touch screen such as PDA. The recognized direction is attached to the button data to be outputted. Hereinafter, it will be described in detail.

Button processor 730 determines to output characters by using long or short pushed button data and data stored in the shift flag. In short, button processor 730 performs the process in FIG. 6 to determine which character corresponding to the pushed button is outputted. Here, it is possible that [button *] and [button #] work as same shift key. If a character has to be outputted according to the determination, then the button processor 730 refers the character table 750 to output one of the first character to the third character on display 760. If no character has to be outputted, then the button processor 730 sets the shift flag. User or manufacture can determine or adjust the assignment of b, b~, *b=#b to which one of the first character to the third character. In addition, if [button *] and [button #] work as a same shift key, it is possible to input numerals and symbols without changing the current mode, and user or manufacture can determine or adjust the assignment of #~b-, #b~, *b~, *~b- to which one of the first symbol to the third symbol.

Memory 740 works as the shift flag, and sends long or short pushed button data and shift flag data to the button processor 730 on receiving a command from the button processor 730. In addition, memory 730 stores the character table 750.

Character table 750 includes set of the first character to the third character corresponding to the determination of the button processor 730.

Display 760 outputs the character outputted from the button processor 730. If the display 760 is a touch screen, the keypad 710 is displayed on the display 760. If the keypad 710 is displayed on the display 760, user can draw a line on a button and select any one of the second character, the third character, numerals or symbols by drawing the line toward predetermined directions.

INDUSTRIAL APPLICABILITY

As aforementioned, according to the character arrangements of the present invention, even if the character arrangements are applied to various input methods, it is possible to input character efficiently and fast. Namely, the user who is accustomed to one of existing input methods can quickly input character with using the character arrangements of the present invention.

It is also possible for the user to input characters fast and efficiently even if the input methods are applied to the existing character arrangements. It is preferable to use the character arrangement and the input method, both of the present invention, at the same time.

Thus, since the character arrangements and input methods can be applied to various portable devices and especially, the user who is already accustomed to the character arrangement of the present invention will accommodate a new portable device with a new input method easily, so the present invention will contribute to activate the market.

The invention claimed is:

1. A symbol character inputting device, based on a keypad including a plurality of key buttons to each of which is assigned a numeral, wherein symbol characters are arranged on the key buttons based on shape similarities between symbols and associated numerals by dividing symbol characters into a 1st Character Set, a 2nd Character Set, and a 3rd Character Set according to usage frequency, selecting one symbol character from each Character Set to form symbol character combinations, and distributing these symbol character combinations over the key buttons; and an input key processing unit for processing the character inputting operation through the keypad and outputting corresponding symbol characters.

2. The symbol character inputting device as set forth in claim 1, wherein the 1st Character Set is an assembly of the most frequently used symbol characters and comprises symbol characters '!', '?', '-', '''', '""', '@', ';', ':', ',' and '.', each of which is inputted using a single key button operation.

3. The symbol character inputting device as set forth in claim 1, wherein the 2nd Character Set comprises the symbol characters '/', '~', '+', '=', '<', '>', '(', ')' and '&' and the 3rd Character Set comprises the symbol characters '\', '|', '[', ']', '_', '{', '}' and '$'.

4. The symbol character inputting device as set forth in claim 1, wherein when a predetermined key button is pressed during the inputting of characters using the keypad, the input key processing unit alters the keypad from a character or numeral input mode to a symbol input mode to provide an array of symbols for processing symbol inputting operation through the keypad, and returning to the previous character or numeral input mode after the input of a symbol.

5. The symbol character inputting device as set forth in claim 4, wherein the predetermined key button is the key button '*'.

6. The symbol character inputting device as set forth in claim 1, wherein the symbol characters '!' and '?' are respectively assigned to numeral key buttons '1' and '2'.

7. The symbol character inputting device as set forth in claim 1, wherein the symbol characters '<' and '>' are respectively assigned to the numeral key buttons '4' and '7'.

8. The symbol character inputting device as set forth in claim 1, wherein the symbol characters '(' and ')' are respectively assigned to the numeral key buttons '6' and '9'.

9. The symbol character inputting device as set forth in claim 1, wherein the symbol characters '''' and '""' are respectively assigned to the numeral key buttons '4' and '5'.

10. The symbol character inputting device as set forth in claim 1, wherein the symbol characters ';', ':', ',', and '.' are respectively assigned to the numeral key buttons '7', '8', '9' and '0'.

11. The symbol character inputting device as set forth in claim 1, wherein the characters '1', '!', and '\' are assigned to the same key button.

12. The symbol character inputting device as set forth in claim 1, wherein the characters '2', '?' and '~' are assigned to the same key button.

13. The symbol character inputting device as set forth in claim 1, wherein the characters '4', '''', and '<' are assigned to the same key button.

14. The symbol character inputting device as set forth in claim 1, wherein the characters '5', '""', and '=' are assigned to the same key button.

15. The symbol character inputting device as set forth in claim 1, wherein the characters '6', '@', and '(' are assigned to the same key button.

16. The symbol character inputting device as set forth in claim 1, wherein the characters '7', ';', and '>' are assigned to the same key button.

17. The symbol character inputting device as set forth in claim 1, wherein the characters '8', ':', and '&' are assigned to the same key button.

18. The symbol character inputting device as set forth in claim 1, wherein the characters '9', ',', and ')' are assigned to the same key button.

19. The symbol character inputting device as set forth in claim 1, wherein the characters '0' and '.' are assigned to the same key button.

20. The symbol character inputting device as set forth in claim 1, wherein the characters '[' and '{' are respectively assigned to two different numeral key buttons selected from among a group of numeral key buttons comprising the numeral key buttons '4' and '6', and the characters ']' and '}' are respectively assigned to two different numeral key buttons selected from among a group of numeral key buttons comprising the numeral key buttons '7' and '9'.

21. The symbol character inputting device as set forth in claims 1, wherein the input key processing unit displays a currently active keypad array on a screen and outputs characters and symbols in response to key inputs corresponding to the characters or symbols.

* * * * *